US012272198B2

(12) United States Patent
Bodell et al.

(10) Patent No.: US 12,272,198 B2
(45) Date of Patent: Apr. 8, 2025

(54) SMART LOCK REMOTE ADMITTING SYSTEM AND METHOD

(71) Applicant: VIZpin, Inc., Lancaster, PA (US)

(72) Inventors: Paul Bodell, Lancaster, PA (US); Rui Manuel Andrade Barreira, Oporto (PT); Peter Dikeman, Cotuit, MA (US)

(73) Assignee: VIZpin, Inc., Lancaster, PA (US)

( * ) Notice: Subject to any disclaimer, the term of this patent is extended or adjusted under 35 U.S.C. 154(b) by 250 days.

(21) Appl. No.: 18/148,726

(22) Filed: Dec. 30, 2022

(65) Prior Publication Data

US 2023/0215233 A1 Jul. 6, 2023

Related U.S. Application Data

(60) Provisional application No. 63/296,294, filed on Jan. 4, 2022.

(51) Int. Cl.
*G07C 9/00* (2020.01)
*G07C 9/27* (2020.01)

(52) U.S. Cl.
CPC ..... *G07C 9/00904* (2013.01); *G07C 9/00571* (2013.01); *G07C 9/27* (2020.01)

(58) Field of Classification Search
None
See application file for complete search history.

(56) References Cited

U.S. PATENT DOCUMENTS

| | | | | |
|---|---|---|---|---|
| 9,646,165 B1 * | 5/2017 | Saylor | E05B 49/00 |
| 10,327,035 B2 * | 6/2019 | Zerr | H04N 21/2143 |
| 10,454,927 B2 * | 10/2019 | Oberhauser | G06F 21/62 |
| 10,475,259 B2 * | 11/2019 | Carter | G07C 9/21 |
| 10,679,446 B2 * | 6/2020 | Santhosh | G06F 21/33 |
| 11,132,877 B2 * | 9/2021 | Scalisi | H04N 7/186 |
| 11,631,291 B2 * | 4/2023 | Schoenfelder | H04L 12/2807 340/5.7 |
| 12,015,500 B2 * | 6/2024 | Schwartz | H04L 12/281 |

* cited by examiner

*Primary Examiner* — K. Wong
(74) *Attorney, Agent, or Firm* — Iandiorio, Teska & Coleman, LLP

(57) ABSTRACT

A method for facilitating communication between a first person such as an occupant of a building with a smart lock and a second person such as a visitor includes receiving at a computer system, from a visitor device app, a smart lock identifier and a visitor device app identifier so the occupant can establish a communication channel between the occupant and the visitor and if desired allow the visitor access to the building (or other property).

21 Claims, 3 Drawing Sheets

SMART LOCK REMOTE ADMITTING SYSTEM AND METHOD

RELATED APPLICATIONS

This application claims benefit of and priority to U.S. Provisional Application Ser. No. 63/296,294 filed Jan. 4, 2022 under 35 U.S.C. §§ 119, 120, 363, 365, and 37 C.F.R. § 1.55 and § 1.78, which is incorporated herein by this reference.

FIELD OF THE INVENTION

Aspects of the invention relate to virtual intercom systems.

BACKGROUND OF THE INVENTION

Typical building visitor intercom systems include a panel at the building (e.g., an apartment building) door lobby with a speaker and a button next to each occupant's apartment number and/or name. A visitor presses the button of the occupant who the visitor would like to visit which causes an intercom in the occupant's apartment to ring. The visitor and occupant can then verbally communicate via the intercom and if the occupant so desires, the occupant can unlock, via the intercom, the front door so the visitor can enter the building.

Proposals have been made to eliminate the need for such hard-wired intercom systems via "virtual intercom" systems. See, for example, U.S. Pat. Nos. 10,846,958; 10,157,512; 10,685,516; 9,666,000; 10,490,000; and 11,151,816 all incorporated herein by this reference.

Some such prior proposals are cumbersome. For example, the visitor may be required to provide a profile or the visitor's location must be computed. In some cases, the visitor must provide certain credentials. In some cases, detectors must be added to detect the presence of the visitor. In other cases, the visitor's location relative to the building must be computed.

BRIEF SUMMARY OF THE INVENTION

Featured is a new system which does not require visitor credentials, which does not require computations concerning the visitor's location, and/or which does not require detectors to detect the presence of a visitor. In this way, the system is not limited to buildings. Instead, the system works with almost anything protected by a smart lock, for example, real property (e.g., a building of tenants, a fenced in outdoor area) and personal property (e.g., a cargo container, an RV, and the like)—even a berth on board a passenger ship. However, as an example only, we will use herein the example of a resident of a building and a visitor to the resident's property.

In one preferred example, a computer system quickly and confidently enables an occupant and a visitor to establish a communication channel (much like with the old hard-wired intercom systems but instead using smart phone technology) and the occupant, if they desire, can then allow the visitor to unlock the building door (preferably using smart lock technology).

More generally, featured is a method for facilitating communication between a first person exercising some level of control over property and a second person desiring access to the property. A second person device app sends a smart lock identifier and a second person device app identifier. Based on the smart lock identifier, information is obtained about the first person. The second person device app sends a request to access the property. Based on the request the first person is notified regarding the request and the first person is provided with the second person device app identifier so the first person can establish a communication channel between the first person and the second person. In the examples that follow, the first person is an occupant of a building and the second person is a visitor. But, the property could be other real and personal types of property, the first person may be the owner, occupier, renter, etc. of the property, and the second person could be someone other than a visitor—e.g., someone requesting access to a cargo container.

The first person, via an app on a first person device, may cause an electronic key for the smart lock to be provided to the second person device app and the second person may then use the electronic key to open the smart lock. The second person device preferably scans a code proximate the smart lock in order to receive the second person device app from the computer system. The computer system may issue a unique app identifier. The device app may prompt the second person to take a selfie image which is transmitted to the first person. The method may include storing identification data based on the selfie image. The first person may establish a voiceover internet protocol communication channel with the second person by sending, from a first person device app, an invitation to the second person device app. The electronic key is preferably deleted from the second person device app after the electronic key is used to open the smart lock. The electronic key is preferably the first person's smart lock key. The first person may generate second person identifier data based on the second person device app identifier and the computer system may store the second person identifier data.

Also featured is a method of admitting a visitor to a building with a smart lock, the method comprising the visitor using a visitor device to scan a code on the building proximate the smart lock, in response to the code, a computer system providing a visitor device app to the visitor device and storing a visitor device app identifier. The visitor device app receives a smart lock identifier from the smart lock and the computer system, based on the smart lock identifier, obtains information about one or more occupants of the building with an occupant device having an occupant app. The visitor device app communicates to the computer system a request concerning an occupant and based on the request, the computer system notifies the occupant device app regarding the request and provides the occupant device app with the visitor device app identifier. The occupant device app uses the visitor device app identifier and sends an invitation to the visitor device app via a communication channel between the visitor device app and the occupant device app. The occupant device app provides to the visitor device app an electronic key for the smart lock and the visitor device app sends the electronic key to the smart lock to unlock the smart lock.

A new method of admitting a visitor to a building with a smart lock features a visitor device app receiving a smart lock identifier from the smart lock and a computer system which, based on the smart lock identifier, obtains information about one or more occupants of the building. The visitor device app communicates to the computer system a request concerning an occupant a communication channel is established between the visitor device app and an occupant device app. The occupant device app may provide to the visitor device app, an electronic key for the smart lock, and the visitor device app may send the electronic key to the smart lock to unlock the smart lock. The computer system may provide the visitor device app to the visitor device.

Also featured is a communication system facilitating communication between a first person exercising some level of control over property with a smart lock and a second person desiring access to the property. A second person device app wirelessly reads a smart lock identifier of the smart lock, wirelessly sends a key to the smart lock which wirelessly communicates with a first person device app and which wirelessly communicates with a computer system. The computer system receives the smart lock identifier from the second person device app and a request from the second person device app concerning a first person corresponding to the smart lock identifier, and the first person device app is configured to receive from the computer system, a request to wirelessly communicate with the second person device app and to wirelessly transmit a key to the smart lock to the second person device app.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
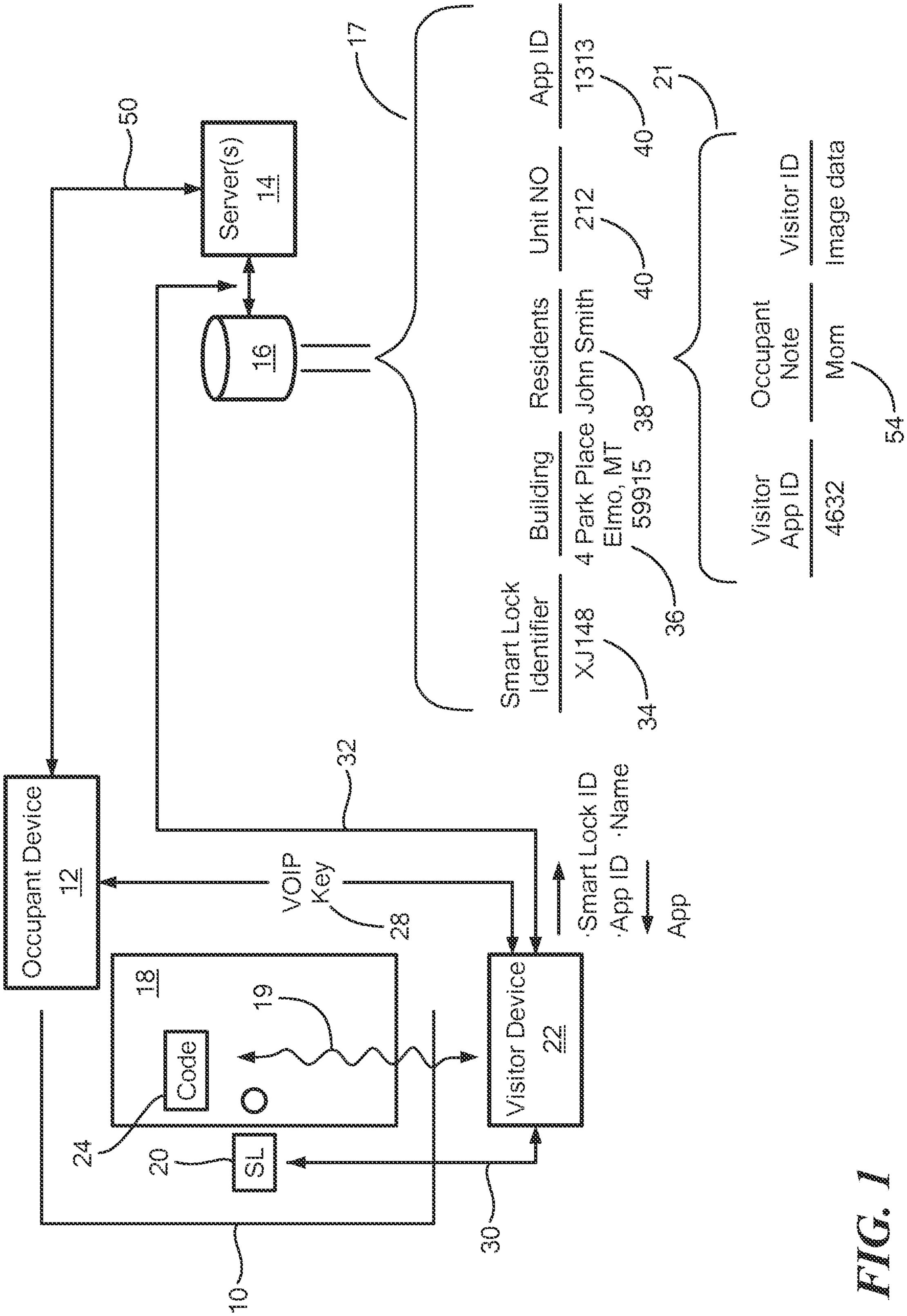
FIG. 1 is a block diagram showing the primary components associated with an embodiment of a visitor management system and method.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Residents (occupants) of a building 10 have access to a smart device 12 (e.g., a smart phone or tablet) with an app downloaded thereon from one or more servers 14 (hereinafter "server"). The server may record and store (e.g., in database 16) an app identifier unique to each occupant and other occupant information as shown at 17. The door 18 to the building includes a smart lock 20. The smart lock could be either a device where the controller and lock mechanism are packaged together, or a controller that drives a separate locking mechanism.

A visitor at the door of the building with one or more residents (occupants) has access to a visitor device 22 (e.g., a smart phone or tablet) and scans a code 24 (e.g., for example a QR code) on the building or door as shown at 19 in order to receive an app (e.g., from the server 14) if the visitor device does not already have the app. The app can also be obtained and loaded on the visitor device via a link on a website or in an email/text from an app store.

The visitor app is assigned a unique identifier by the server which is stored along with other information as shown at 21. Ideally this identifier would be based on an identifier that can be directly linked to the hardware or user (e.g., phone serial number, phone number, MAC address, etc.) so that it will remain the same even if the app is uninstalled and reinstalled. In most cases, smart phone operating systems block getting this information programmatically and it would need to be obtained with the aid of the visitor. While this is possible, it is inconvenient for the visitor and not the preferred embodiment. As a compromise, we settle for a visitor app identifier as being adequate for our use even though it is a non-permanent identifier. This identifier is used to facilitate communication 28 with an occupant similar to the way a phone number is used when making a phone call. VOIP communications can be used with or without video.

Visitor identifier data may also be stored along with the visitor smart device app identifier. This visitor identifier data might be based on data generated from an analysis of a selfie image provided by the visitor similar to the process used by Apple Face ID, or other biometric data. It is preferably not personally identifiable data, i.e., the system typically has no way of knowing or inferring who this data actually belongs to since the visitor is not asked for any personal information. The distinction between the visitor app identifier and visitor identifier is that the visitor app identifier is tied to a particular instance of a visitor app installation on a smart device. If the app is removed and reinstalled, the visitor smart device app identifier changes. There may be no way to link the two app identifiers since there are no credentials or other information for the visitor. The visitor identifier data is a type of a more permanent identifier and even though the biometric data is recalculated with a new installation and a new selfie, there is a high probability that it can be matched to an existing visitor smart device app identifier. Preferably, neither of the identifiers are used to gain access to the system. Instead, the identifiers are used to help the occupant in deciding whether or not to communicate with or to grant access to a particular visitor.

Although it is not required, in situations where higher security is required, such as access to a cargo container, it will be advantageous to obtain personally identifiable data and authenticate the person seeking access by requiring registration and system login.

The visitor device app detects the smart lock 20 as shown at 30 (e.g., a VIZpin device, see U.S. Pat. Nos. 11,069,164; 10,021,551 incorporated herein by this reference) using, for example, Bluetooth technology.

The smart lock 20 stores a lock identifier such as a serial number and this lock identifier is read by the visitor device app and forwarded to the server 14 from the visitor device app via the internet as shown at 32. The server 14 consults database 16 and notes the lock identifier 34 corresponds to a group of occupants or other authorized person who have access rights to this smart lock 20. Additional data may include certain additional information about the occupants such as their apartment number, name, occupant device app identifiers, and the like, as shown at 40.

An alternative approach to obtaining the lock identifier from the smart lock via Bluetooth would be to obtain an entrance identifier which is globally unique. The entrance identifier can be used in place of the lock identifier and provides the same functionality. This entrance identifier could be obtained in any number of ways. For example, via a QR code scan, a wireless beacon that need not be part of the entrance lock/smart lock, manual data entry by the visitor, etc. One advantage to doing this is that it allows the system to use traditional centralized access control instead of a smart lock. If the visitor is to be admitted, then a key/unlock command is sent or caused to be sent to the centralized access controller. Typically, this would be done via the internet or from the visitor device via a wireless technology such as Wi-Fi. The centralized access controller would then unlock the entrance.

Notably, the location of the visitor device need not be computed based on its GPS coordinates nor does the location of the visitor device need to be estimated based on the visitor device connecting to the Wi-Fi of the building or a Bluetooth connection. Nor do computations need to be made to determine if the visitor device is within a predetermined bounded area. No predetermined bounded area need be specified. Moreover, the visitor device 22 is typically not logged in to the server 14 and no user profile of the visitor is required. The visitor's credentials, actual identification, and the like are preferably not known by the system.

Also, a sensor such as a camera, proximity beacon, motion sensor, or the like is not needed to detect the presence of the visitor. The visitor is not usually identified.

Instead, the server 14 allows a resident to communicate directly with the visitor (e.g., via VOIP as shown at 28) and it is the resident who decides whether or not to admit the visitor into the building via the smart lock.

For example, the visitor then uses the visitor device 22 and the visitor device app to enter a resident name which is transmitted to the server 14. The server 14 may prompt the visitor to take a selfie picture which is also transmitted to the occupant device app along with a notification that a visitor is at the door of the building as shown at 50.

The server may query whether or not the occupant desires to communicate with the visitor. If the occupant does desire to communicate with the visitor, the occupant can establish an internet VOIP call between the occupant's device app and the visitor's device app with or without video as shown at 28. For example, the occupant, via the occupant device app, may send an invite to the visitor device app which the visitor may accept. Also, the occupant can forward a request to communicate and the server can, in response, initiate a call between the visitor device app and the occupant device app since the server stores both app identifiers. Push notifications and the like may be used.

The server 14 could also provide the occupant device 12 with the visitor app identifier in order for the occupant to send an invite to the visitor device app. In this way, communications begin between the visitor and occupant. The occupant, if they then desire, can use the occupant's device 12 app to send an encrypted copy of the occupant's key to the visitor app on visitor device 22. The key can be sent via the VOIP connection or via the server. The occupant could request that the server send a key to the visitor device. The visitor device app will then use the key to automatically unlock the smart lock as shown at 30 and thus allow the visitor to gain admittance to the building 10. An audit trail may be created that indicates the occupant's key was used by a visitor. After one usage, the occupant's key is preferably removed from the visitor device.

If the occupant does not desire to be contacted in the future by a particular visitor device, the occupant may request the system to block the visitor device requests based on the visitor identifier data, if it exists, else the app identifier is used. The visitor app would typically show an indication that the occupant was "not home." The occupant can also for any visitor, make a note (additional visitor identification data) which is stored, for example, if the visitor is a regular visitor, for example a relative as shown at 54. Then, the next time the relative arrives at the building, the server will notify the occupant that the detected visitor or app identifier corresponds with the occupant's note stored in database 16.

The occupant may also choose not to be listed in any visitor's app, i.e., they may opt out of using the visitor management system and method herein described. If this happens, this specific user will not be listed on any visitor's app, but the visitor app keeps the ability of listing all other users. Also, various visitors may be blocked by the occupant, for example, using the visitor device app identifier and/or visitor identifier data and instructing the server 14 to block a specific visitor.

The system and method then, in one preferred embodiment, thus includes several channels. One channel is between the server and the occupant device in order to include on the occupant's device an app and in order to store the occupant's app identifier. Typically, the app can be obtained from an independent server such as the app store or play store. The app identifier is generated by the app or assigned by the server upon first connection of the visitor device to the server. The channel between the server and the occupant device also enables the occupant to provide information to the server and the server to provide information to the occupant via the occupant device app, for example, a notification that a visitor wishes to communicate with the occupant, the visitor device app identifier, visitor identifier data and/or visitor selfie image.

Another channel is between the visitor device app and the smart lock. Using this channel, the lock identifier is wirelessly provided by the smart lock to the visitor device app. Also, using this channel, the visitor device app can use a valid key to wirelessly unlock the smart lock.

Still another channel is between the visitor device and the server. This channel is used to provide the app for the visitor device and to note and store the visitor device app identifier. This channel is also used for the visitor device app to provide a selfie image to the server and possible visitor identifier information to the server. This is also the channel that the visitor device app transmits the smart lock identifier to the server. The channel between the visitor device and the server is also how the visitor device app communicates a request concerning a specific occupant to the server. Through this channel, the server may also provide occupant data to the visitor device app.

The final channel is between the visitor device app and the occupant device app via, for example, server 14 or via the internet. Using this channel, communication between the visitor and occupant is possible where, for example, a VOIP call can be established between the visitor device app and the occupant device app. Also, it is using this channel that the occupant device app can transmit a smart lock key to the visitor device app or cause a valid key to be transmitted by the server.

Figure 2:
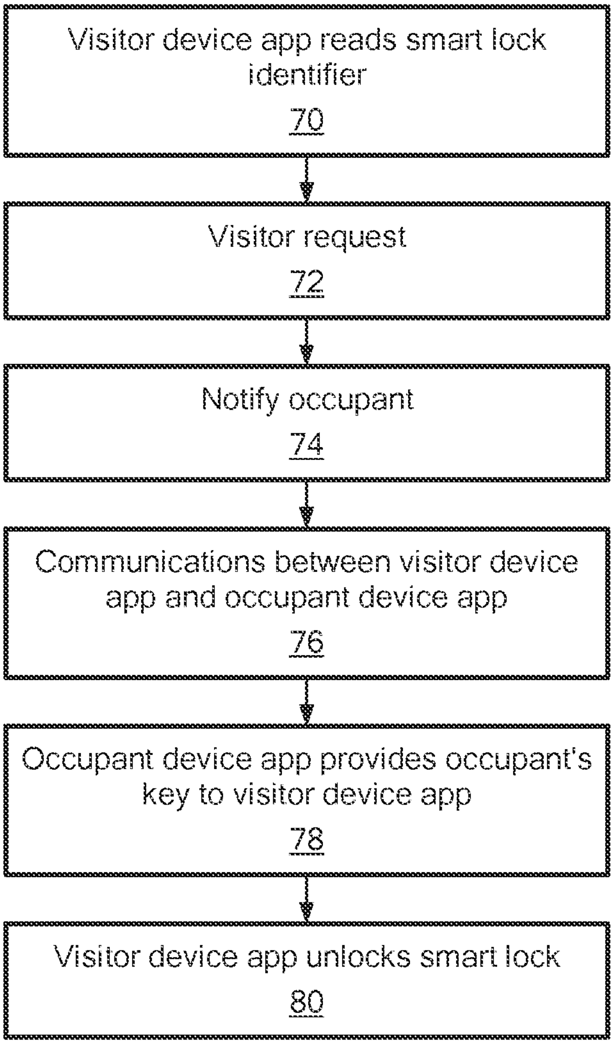
FIG. 2 is a flow chart depicting the primary steps associated with an example of a method for facilitating communication between an occupant of a building with a smart lock and a visitor.
Figure 4:
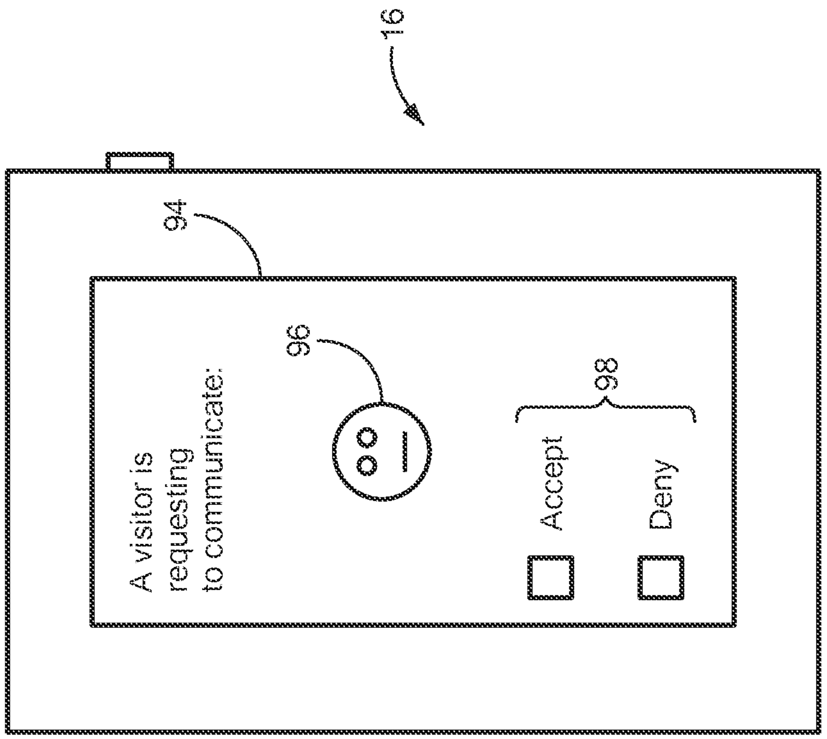
FIG. 4 shows an example of an occupant device app on a smart device.
Figure 3:
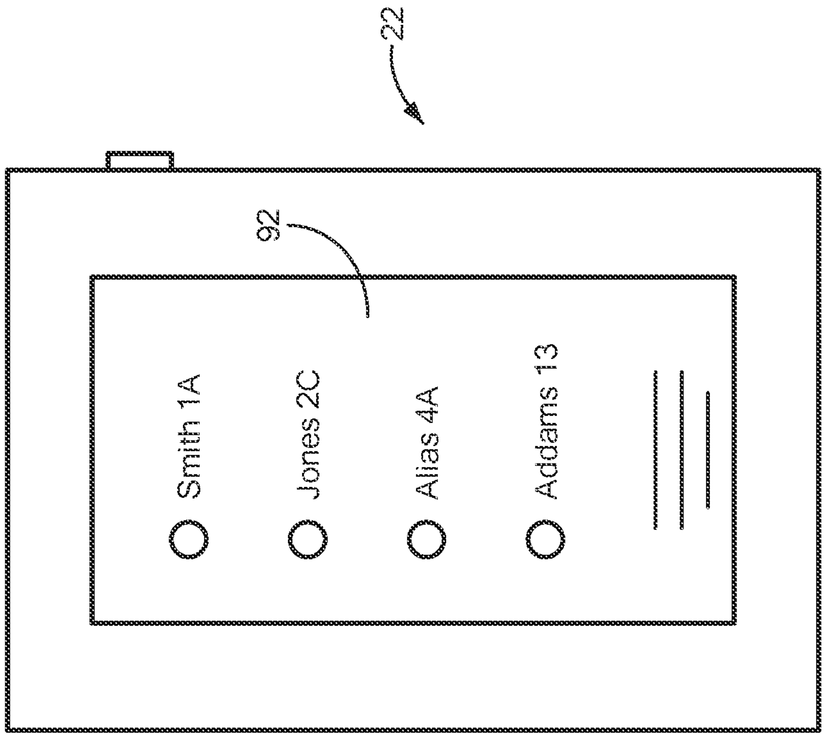
FIG. 3 shows an example of a visitor device app on a visitor smart device.

In FIG. 2, the visitor device app is downloaded on the visitor device and in step 70, the visitor device app reads the smart lock identifier for the smart lock wirelessly, for example via Bluetooth. The visitor device app sends the smart lock identifier to the server which has stored occupant data associated with the received smart lock identifier and thus the server can intelligently accept a visitor request from the visitor device app, step 72. FIG. 3 shows how the visitor device 22 app can display, via the server, a depiction of an intercom panel where the visitor can select an occupant as shown at 92. Once the visitor selects, for example, "Adams", the server receives this request and in response notifies a particular occupant via her occupant smart device app, step 74. FIG. 4 shows the occupant device 16 with a notification 94 thereon along with the visitor's image at 96 and a selection option at 98. If the occupant so chooses, the occupant can establish a communication channel between the visitor and the occupant via, for example, the visitor device app and the occupant device app, step 76. And, again, if the occupant so desires, the occupant can use the occupant device app to provide the occupant's key to the smart lock to the visitor device app, step 78 and the visitor, via the visitor device app, can use the key to wirelessly unlock the smart lock, step 80.

In this way, anything protected by a smart lock (e.g., a building of tenants, a fenced in outdoor area, an RV, a cargo container, a berth on a passenger ship) can be remotely accessed in a secure fashion.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A method for facilitating communication between a first person with a first person device app exercising some level of control over property and a second person desiring access to the property; the method comprising:

receiving at a computer system, from a second person device app, a smart lock identifier and a second person device app identifier;

based on the smart lock identifier, obtaining information about the first person;

receiving at the computer system, from the second person device app, a request to access the property; and based on the request, notifying the first person regarding the request and providing the first person with the second person device app identifier so the first person can establish a communication channel between the first person device app and the second person device app.

2. The method of claim 1 in which the first person is an occupant of a building and the second person is a visitor.

3. The method of claim 1 in which the first person, via the first person device app, causes an electronic key for the smart lock to be provided to the second person device app and the second person uses the electronic key to open the smart lock.

4. The method of claim 1 in which the second person device scans a code proximate the smart lock in order to receive the second person device app from the computer system.

5. The method of claim 4 in which the computer system issues a unique app identifier.

6. The method of claim 1 in which the second person device app prompts the second person to take a selfie image which is transmitted to the first person.

7. The method of claim 6 further including storing identification data based on the selfie image.

8. The method of claim 1 in which the first person establishes a voiceover internet protocol communication channel with the second person by sending, from the first person device app, an invitation to the second person device app.

9. The method of claim 3 in which the electronic key is deleted from the second person device app after the electronic key is used to open the smart lock.

10. The method of claim 9 in which the electronic key is the first person's smart lock key.

11. The method of claim 1 in which the first person generates second person identifier data based on the second person device app identifier and the computer system stores the second person identifier data.

12. A method of admitting a visitor to a building with a smart lock, the method comprising:

the visitor using a visitor device to scan a code on the building proximate the smart lock;

in response to the code, a computer system providing a visitor device app to the visitor device and storing a visitor device app identifier;

the visitor device app receiving a smart lock identifier from the smart lock;

the computer system, based on the smart lock identifier, obtaining information about one or more occupants of the building with an occupant device having an occupant app;

the visitor device app communicating to the computer system a request concerning an occupant;

based on the request, the computer system notifying the occupant device app regarding the request and providing the occupant device app with the visitor device app identifier;

the occupant device app, using the visitor device app identifier, sending an invitation to the visitor device app via a communication channel between the visitor device app and the occupant device app;

the occupant device app, providing to the visitor device app, an electronic key for the smart lock; and the visitor device app sending the electronic key to the smart lock to unlock the smart lock.

13. The method of claim 12 in which the computer system issues a unique visitor device app identifier.

14. The method of claim 12 in which the visitor device app prompts the visitor to take a selfie image which is transmitted to the occupant.

15. The method of claim 12 in which the communication channel is a voiceover internet protocol communication channel.

16. The method of claim 12 in which the electronic key is deleted from the visitor device app after the electronic key is used to open the smart lock.

17. The method of claim 12 in which the electronic key is the occupant's smart lock key.

18. A method of admitting a visitor to a building with a smart lock, the method comprising:

a visitor device app receiving a smart lock identifier from the smart lock;

a computer system, based on the smart lock identifier, obtaining information about one or more occupants of the building with an occupant device having an occupant device app;

the visitor device app communicating to the computer system a request concerning an occupant; and based on the request, establishing a communication channel between the visitor device app and the occupant device app.

19. The method of claim 18 further including:

the occupant device app, providing to the visitor device app, an electronic key for the smart lock, and the visitor device app sending the electronic key to the smart lock to unlock the smart lock.

20. The method of claim 18 in which the computer system provides the visitor device app to the visitor device.

21. A communication system facilitating communication between a first person exercising some level of control over property with a smart lock and a second person desiring access to the property, the system comprising:

a second person device app which wirelessly reads a smart lock identifier of the smart lock, wirelessly sends a key to the smart lock, which wirelessly communicates with a first person device app, and which wirelessly communicates with a computer system;

the computer system receiving the smart lock identifier from the second person device app and a request from the second person device app concerning the first person corresponding to the smart lock identifier; and the first person device app configured to receive, from the computer system, the request to wirelessly communicate with the second person device app, and to wirelessly transmit a key to the smart lock to the second person device app.

* * * * *